Sept. 8, 1931. R. J. DUNHAM 1,822,616
ANTISKID DEVICE
Filed April 23, 1930
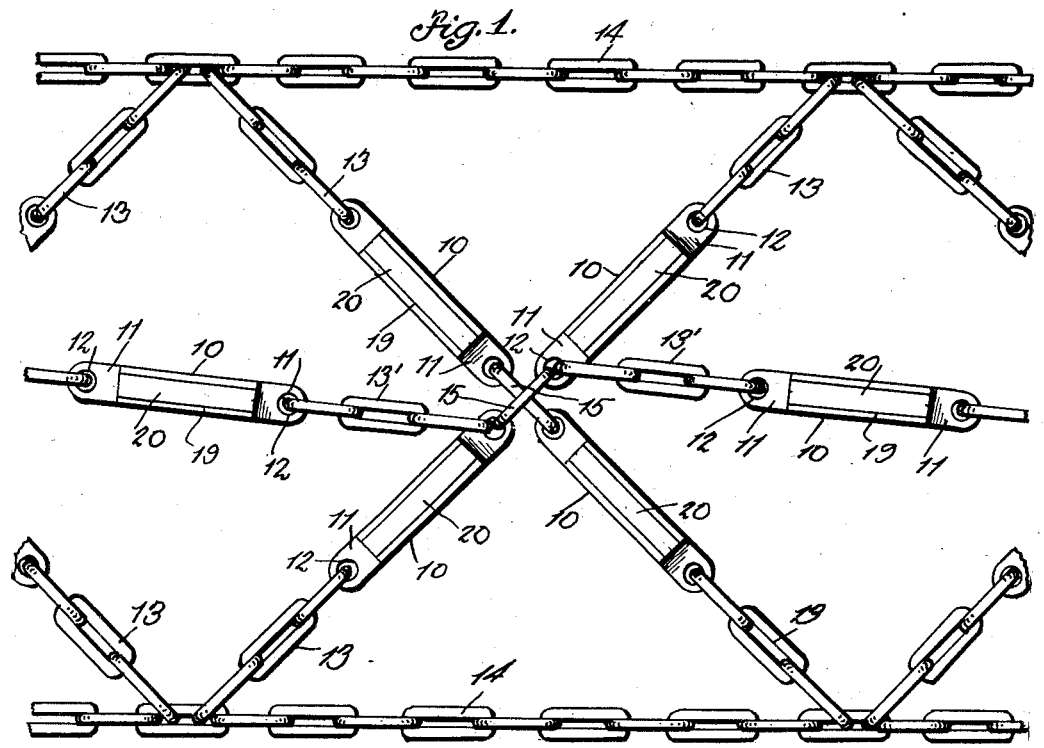
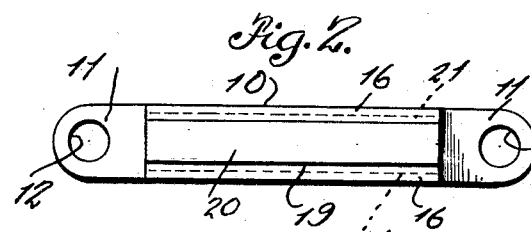
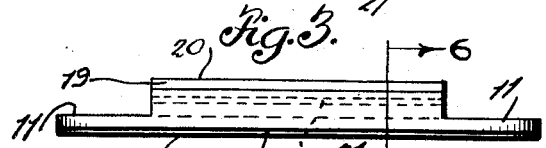
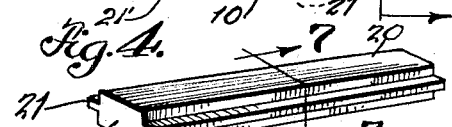
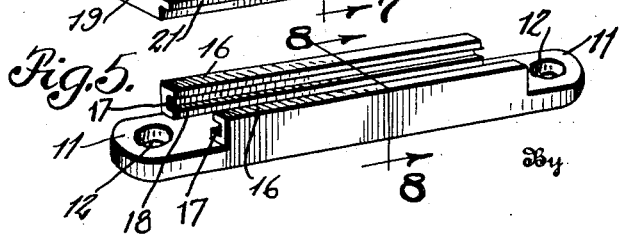
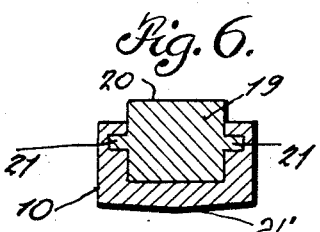
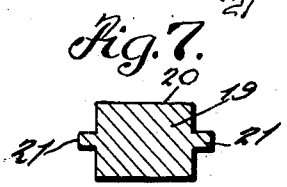
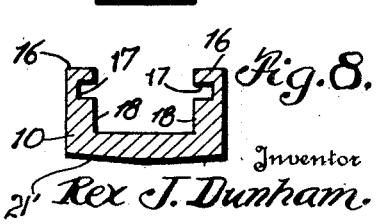
Inventor
Rex J. Dunham
By
Bryant & Lowry
Attorneys Patented Sept. 8, 1931

1,822,616

UNITED STATES PATENT OFFICE

REX J. DUNHAM, OF MILWAUKEE, WISCONSIN

ANTISKID DEVICE

Application filed April 23, 1930. Serial No. 446,668.

This invention relates to improvements in anti-skid devices of the type employed on motor vehicles.

The primary object of the invention is to provide an anti-skid device having detachable traction increasing caulks adapted to be removed from the cross members of the traction device when the caulks have become worn.

A further object of this invention is to provide a device of the above mentioned character comprising a cross member adapted to be secured to the tread of a vehicle tire by means of fastening chains or the like whereby vibration in the present day anti-skid devices is overcome.

A still further object of this invention is to provide an anti-skid device having cross numbers extending diagonally across the tread of the tire and having removable ground engaging faces whereby the same may be reversed when worn to a smooth surface.

A still further object of this invention is to provide an anti-skid device having anti-skid cross link members with hardened steel ground engaging inserts which may well last a considerable length of time.

Other objects and advantage of the invention will become apparent during the course of the following description of the drawings forming a part of this specification and in which:

Figure 1 is a plan view of the anti-skid device showing the arrangement of the ground engaging links and the manner of connecting the same to the retaining side chains;

Figure 2 is a top elevational view of one of the ground engaging cross members disconnected from the retaining chains;

Figure 3 is a side elevational view of the ground engaging member showing the retaining lugs for receiving the retaining chains or cables;

Figure 4 is a longitudinal perspective view of one of the hardened steel inserts removed from the cross-link;

Figure 5 is a longitudinal perspective view of one of the cross links showing the hardened steel insert removed;

Figure 6 is a transverse cross sectional view of the cross link taken on line 6—6 of Figure 3 showing the manner of removably holding the hardened steel insert in position in the cross link;

Figure 7 is a transverse cross-sectional view taken on line 7—7 of Figure 4 illustrating the tongues on the sides of the hardened steel inserts; and Figure 8 is a transverse cross sectional view taken on line 8—8 of Figure 5 showing the longitudinal cut away portion for receiving the hardened steel inserts.

For a more detailed description of the invention, reference is had to the drawings wherein the reference character 10 will generally be used to designate a cross link of an anti-skid device. The cross link 10 is provided with ears 11, having openings 12, for receiving retaining chains 13. As illustrated in Figure 1, the cross links 10, extend in a diagonal relation across the tread of a tire and are held thereon by the conventional type of side chains 14. The inner ends of the cross links 10 are connected together by connecting links 15, while longitudinal anti-skid links 10 may connect the junctures of the inner ends of the diagonal cross links 10, by means of connecting links 13'.

As illustrated in Figures 2 to 8 inclusive the cross link 10 is formed with integral side ribs 16, extending longitudinally of the link and having longitudinally extending grooves 17 formed in the inner walls 18. The tread engaging face of the cross links 10 is formed with an angular face 21' for preventing slippage of the links on the tire tread.

Each of the hardened metal inserts 19, is provided with a ground engaging face 20, which may be roughened or as illustrated in the drawings, to prevent skidding of the wheel upon which the anti-skid device is attached. A pair of oppositely extending tongues 21 are formed integral on the longitudinal side walls of hardened metal insert 19, for being received in grooves 17 of the cross link 10.

The hardened metal insert is adapted to slide longitudinally into the cross link 10 and between the side walls 16 thereof and is held against removal by the connecting chains passing through the opening 12, in the ears 11.

It is to be understood that wire cables may be employed for connecting the cross links together and for securing the links to the tread of a vehicle tire.

It is also to be understood that various changes in the shape, size and arrangement of parts upon the tread of a vehicle tire may be resorted to without departing from the spirit of the invention or the scope of the subjoined claims.

Having thus described the invention what is claimed is:—

1. An anti-skid device of the character described, comprising an elongated cross link, ears formed on the ends of each cross-link having openings for receiving a retaining member, a hard metal insert carried by the cross-link, whereby the same may be removed or reversed when worn, and means for retaining the removable insert in place.

2. An anti-skid device of the character described, comprising an elongated grooved cross-link having ears at opposite ends thereof, an insert carried by the cross-link in the grooved portion thereof, said insert being of a harder metal than the cross-link, and means for fastening the cross link to the tread of a vehicle tire, said means also forming a retainer for the hard metal insert.

In testimony whereof I affix my signature.

REX J. DUNHAM.